United States Patent
Schallmoser et al.

(10) Patent No.: US 8,554,503 B2
(45) Date of Patent: Oct. 8, 2013

(54) METHOD FOR CALIBRATING A THICKNESS GAUGE

(75) Inventors: Günter Schallmoser, Ruhstorf (DE); Karl Wisspeintner, Ortenburg (DE); Robert Wagner, Neuburg am Inn (DE)

(73) Assignee: Micro-Epsilon Messetechnik GmbH, Orgenburg (DE)

( * ) Notice: Subject to any disclaimer, the term of this patent is extended or adjusted under 35 U.S.C. 154(b) by 360 days.

(21) Appl. No.: 12/992,993

(22) PCT Filed: Apr. 21, 2009

(86) PCT No.: PCT/DE2009/000517
§ 371 (c)(1),
(2), (4) Date: Feb. 9, 2011

(87) PCT Pub. No.: WO2009/138053
PCT Pub. Date: Nov. 19, 2009

(65) Prior Publication Data
US 2011/0125442 A1    May 26, 2011

(30) Foreign Application Priority Data

May 16, 2008   (DE) .......................... 10 2008 023 987
Mar. 3, 2009   (DE) .......................... 10 2009 011 122

(51) Int. Cl.
*G01C 25/00*   (2006.01)
*G01B 5/06*    (2006.01)
*G01B 21/08*   (2006.01)

(52) U.S. Cl.
USPC ............... 702/97; 73/597; 324/202; 356/503; 702/158; 702/170

(58) Field of Classification Search
USPC ............. 702/90, 91, 92, 94, 95, 97, 104, 158, 702/170; 73/1.81, 597; 324/202; 356/503, 356/601, 614, 625; 700/173
See application file for complete search history.

(56) References Cited

U.S. PATENT DOCUMENTS

| | | | |
|---|---|---|---|
| 4,955,225 A * | 9/1990 | Kniest et al. | 73/597 |
| 5,485,082 A | 1/1996 | Wisspeintner et al. | |
| 5,798,836 A | 8/1998 | Shimokawa | |
| 6,480,286 B1 * | 11/2002 | Kubo et al. | 356/503 |

FOREIGN PATENT DOCUMENTS

| | | |
|---|---|---|
| DE | 44 07 215 | 9/1995 |
| JP | 2006-189389 A | 7/2006 |
| WO | WO 99/44012 | 9/1999 |

OTHER PUBLICATIONS

International Search Report for International Application No. PCT/DE2009/000517.
Written Opinion for International Application No. PCT/DE2009/000517 (undated).

* cited by examiner

*Primary Examiner* — John H Le
(74) *Attorney, Agent, or Firm* — Alston & Bird LLP (57) ABSTRACT

A method for calibration of a thickness gauge is provided in which the thickness gauge measures the thickness of a measured object in a stipulated measurement direction with at least one displacement sensor, operating contactless or by scanning, a reference object with known thickness and shape being brought into at least one partial area of the measurement field of the at least one displacement sensor.

15 Claims, 8 Drawing Sheets

METHOD FOR CALIBRATING A THICKNESS GAUGE

BACKGROUND OF THE INVENTION

1. Field of the Invention

The invention concerns a method for calibration of a thickness gauge, in which the thickness gauge measures the thickness of a measured object in a stipulated measurement direction with at least one displacement sensor, operating contactless or by scanning, a reference object with known thickness and shape being brought into at least one partial area of the measurement field of the at least one displacement sensor.

2. Description of Related Art

A method for calibration of a thickness gauge with two displacement sensors operating contactless or by scanning is known from DE 40 11 717 A1, in which a reference object with known thickness is brought into the measurement field of the displacement sensors. In the known method, two sensors measure the distance to the top and bottom of the reference object from the top and bottom of the reference object in a stipulated measurement direction. These two independent measured values in the form of determined distance values are subtracted from the known distance of the sensors from each other, so that the thickness of the reference object is obtained. Since the sensors ordinarily exhibit non-linearities in their measurement behavior, the reference object is moved back and forth in the axial direction of the sensors, i.e., in the measurement direction, between the sensors, so that several thickness measurements can be made as a function of the position of the reference object. In other words, the distance between the displacement sensors and the reference object or the thickness of the reference object can be measured in any number of relative positions of the reference object and the deviation of sensor measured values from the stipulated known thickness of the reference object resulting from the non-linearity of the displacement sensors for each relative position can be recorded as the measurement error assigned to the corresponding sensor measured value and stored. During a subsequent thickness measurement of any object, the non-linearities of the displacement sensors can therefore be compensated over the entire measurement range.

In the known methods, it is problematical that during calibration it is of great significance that the reference object must always be moved back and forth very exactly without tilting in the axial direction of the opposite sensors. Tilting of the reference object causes a significant distortion of the measured values as a function of the tilting angle. A much greater presumed thickness is measured in a tilted reference object than in an untilted reference object. Tilting of only 5° already results in a measurement error of 0.38%, which is already much too high for many precision measurements, where layer thicknesses of sheets, films or the like are monitored.

To guarantee exact calibration and measurement, both the reference object and the actual measured object must therefore be guided precisely parallel, which is only very difficult in practice or often even impossible.

Another drawback of the known method consists of the fact that slightly different thicknesses of the reference object, which occur, for example, because of surface roughness or local unevenness, distort the calibration.

The underlying task of the present invention is therefore to provide a method for calibration of a thickness gauge, with which a particularly accurate and simple calibration is made possible.

SUMMARY OF VARIOUS EMBODIMENTS

The aforementioned task is solved by a method as described by the various embodiments herein. According to it, a method is claimed for calibration of a thickness gauge, in which the thickness gauge measures the thickness of a measured object in a stipulated measurement direction. The thickness gauge has at least one displacement sensor, operating contactless or by scanning, a reference object with known thickness and shape being brought into at least one partial area of the measurement field of at least one displacement sensor. Recording of at least two independent measured values by the at least one displacement sensor at at least two stipulated locations on a first surface of the reference object occurs as first method step, specifically at stipulated times $t_j$ or as a function of the stipulated positions $p_j$ of the reference object in the measurement field. Determination of tilting or the spatial position of the reference object of the measurement field from the previously recorded measured values at times $t_j$ or as a function of positions $p_j$ of the reference object occurs next. Recording of another measured value by the at least one displacement sensor on another location situated in the measurement device on a second surface opposite the first surface or on a surface area of the reference object opposite the first surface then occurs or essentially simultaneously with recording of the previously measured values, in order to determine the thickness value of the reference object in the measurement direction. This is followed by calculation of a thickness value of the reference object from the measured values of the at least one displacement sensor at times $t_j$ or in positions $p_j$ in the measurement direction. Finally, calculation of the difference between the calculated thickness value and the known thickness of the reference object occurs to obtain correction values dependent on position and tilting or location in the partial area or measurement field, in order to be able to compensate during thickness measurement for geometric errors and/or non-linearities of the at least one displacement sensor in the partial area or measurement field.

In contrast to the known methods, in the method according to the invention, not only does point-like measurement and calibration occur, but calibration based on multi-dimensionally recorded measured values.

In the simplest case, two independent measured values are initially recorded at two stipulated locations on a first surface of the reference object. Tilting in a plane can be established from these two measured values. The measured values are recorded at stipulated times $t_j$ or as a function of position $p_j$ of the reference object.

An additional measured value is then recorded by means of the at least one displacement sensor, which virtually originates from the side of the reference object opposite the surface, so that the thickness of the reference object can be determined in the measurement direction. Recording of this additional measured value also occurs at time $t_j$, if a measurement is supposed to occur at stipulated times $t_j$, so that the additional measured value correlates with the measured values recorded previously on the first surface. If the measurement is to occur as a function of stipulated positions $p_j$ of the reference object in the measurement field, recording of the additional measured value can also occur at a later time. However, the reference object must then be situated in the same position $p_j$ as during recording of the measured values on the first surface.

The thickness value of the reference object at times $t_j$ or in positions $p_j$ in the measurement direction is now calculated from the determined measured values.

Calculation of the difference between the calculated thickness value and the known thickness of the reference object then occurs, in order to obtain the desired correction values for calibration.

It should also be noted in the method according to the invention ultimately two measured values are sufficient, which can also be furnished by two point sensors for determination of tilting in space with virtually two-dimensional recording of the measured values. The rule then applies that two measurement points are sufficient, in order to define a line. A linear scanner is not required for this purpose.

This similarly applies for the virtually three-dimensional recording of measured values, in which here ultimately three measured values are sufficient, which can be furnished by three point sensors. It then applies that a surface is already completely defined by at least three points. For example, two laser triangulation sensors can be situated on the top and/or bottom of the reference object of the measured object. The slope in one direction can therefore already be determined. The position in space can even be determined with three sensors.

The method according to the invention functions with at least one and therefore also with only one displacement sensor, which furnishes at least two independent measured values. For example, in transparent media (for example, a glass plate or plastic film), a signal in the form of a light spot on the detector cell, both from the top of the material and medium and from the bottom, can be obtained with an optical scanner, for example, a laser line scanner, or also a confocal line scanner. This also functions in non-transparent media, for example, by using a mirror, so that signals from the top and bottom can be projected onto the same linear scan. Signals from the top and bottom could also be obtained with other measurement principles with only one sensor, in which ultrasonic or x-ray methods could be considered here.

In the method according to the invention, the subscript j in times $t_j$ and positions $p_j$ denotes a natural number that marks consecutive time points or positions.

With the method according to the invention, calibration is possible simple fashion, which also gives correct calibration values in tilted reference objects. Ultimately, a calibration independent of tilting is possible with the method according to the invention. Exact parallel guiding of a reference object during calibration is no longer necessary.

Consequently, a method is provided with the method according to the invention, with which a particularly accurate and simple calibration is made possible.

In a specific method, the reference object could be moved within at least one partial area of the measurement field, so that a number of correction values for the corresponding position and location or tilting of the reference object is obtained in a variety of positions or at a variety of times in a movement trend of the reference object in the measurement field. The more values are recorded, the more correction values can be generated and the more accurate a subsequent thickness measurement on a measured object.

The measured values in the method can be recorded in the form of value pairs $((x_i^1; z_i^1), (x_i^2; z_i^2))$ during establishment of tilting of the reference object in a stipulated plane. These value pairs pertain to measured values of sensors 1 and optionally 2, independent of each other, at arbitrarily many and at least two measurement points i, denoted by x- and z-coordinates.

In establishing the three-dimensional spatial position of the reference object, value triples $((x_i^1; y_i^1; z_i^1), (x_i^2; y_i^2; z_i^2))$ are recorded, in which the superscript again pertains to a sensor number and the subscript i to a consecutive measured value number. The value triples $(x_i^1; y_i^1; z_i^1)$ and $(x_i^2; y_i^2; z_i^2)$ accordingly pertain to measured values of sensors 1 or 2, independent of each other, at arbitrarily many and at least two measurement points i that are denoted by x-, y- and z-coordinates. The measured values are recorded as a function of the position $p_j$ of the reference object or, as an alternative, at stipulated times $t_j$. The measured value recording at stipulated times $t_j$ means that for calculation of the thickness of the reference object, the value pairs $(x_i^1; z_i^1)$ and $(x_i^2; z_i^2)$ must be used, which were recorded at the same time $t_j$. The same applies with respect to value triples that were recorded during calculation of the thickness of the reference object at the stipulated time $t_j$.

The method according to the invention for calibration of the thickness gauge forms the basis for a very accurate measurement of any measured objects. After performance of the above calibration and corresponding recording and determination of correction values, a thickness measurement can be performed on a measured object according to the above measured value recording, tilting or location determination and thickness value determination, in which a correction of the thickness value could occur with the correction values. The measured value recording then occurs similar to calibration methods, in which value pairs or value triples can also be recorded at stipulated times or as a function of the position of the measured object. Determination of tilting or the location of the measured object and thickness value calculation also occur in similar fashion, the calculated thickness values being corrected with the correction values.

Compensation for geometric errors could advantageously include compensation of angle error, which occurs especially in laser sensors during lateral impingement on the reference object and/or measured object. Other geometric errors could also be compensated by this.

Recording of the measured values could advantageously occur along a line or surface or form of the reference object and/or measured object. Such a line need not necessarily be a straight line. For example, a line during use of a laser scanner is the intersection line of the light beam with the reference or measured object, which naturally is not a straight line in structured objects, but represents the surface structure at the intersection line.

Establishment of tilting of position of the reference object and/or measured object in space could therefore be establishment of tilting or position of a line or surface of the reference object and/or measured object. Specifically, establishment of tilting or position of the reference object and/or measured object could be establishment of tilting or position of the line or surface.

Depending on the requirement, determination of tilting or position could occur in absolute coordinates. As an alternative or in additional to this, determination of tilting or position could occur relative to at least one of the displacement sensors.

Specifically, determination of tilting or position could include determination of a tilt angle, by which the reference object is sloped relative to a displacement sensor.

However, not only the tilt angle or tilting or position of the reference object or measured object relative to a sensor could be determined, but relative tilting or position of two sensors to each other and/or to the reference object or measured object could also be determined with an appropriately structured reference object.

Determination of tilting or position could occur by means of the recorded measured values themselves. To determine tilting in the case of a measurement along a line, two measurement points are sufficient, from which tilting or a tilt angle can be calculated. During recording of measured values along a surface, ultimately three measured points are sufficient, in order to determine the position and also tilting of the surface in space.

The correction values could be stored in particularly simple fashion in a memory. As an alternative to this, the correction values could be entered as a function. Generation of such a function is often not very simple, but memory space could be saved by this in comparison with storage of correction values in a memory. The generation of such a function in inductive sensors is generally relatively simple, since error functions there generally produce an S-curve or an exponential curve. Generation of the function in optical sensors, however, is generally very difficult, since statistical distributions of the errors are usually present there.

In additional, with respect to a particularly accurate calibration, before determination of tilting or position of the reference object and/or measured object, an ideal line $g^1(x_i^1; z_i^1)$ and/or $g^2(x_i^2; z_i^2)$ or ideal surface $f^1(x_i^1; y_i^1; z_i^1)$ and/or $f^2(x_i^2; y_i^2, z_i^2)$ could be calculated from the measured values at each time $t_j$ or in each position $p_j$. By calculation of such lines or surfaces, the effect of surface roughness on calibration is largely avoided, since virtual smoothing of the surfaces of the reference object and/or measured object occurs on this account. Such calculation of ideal lines and/or surfaces could occur by average value formation or interpolation.

In calculating the thickness of the reference object from the measured values, the ideal lines and/or surfaces could form the basis or be used. As a result, a particularly accurate calibration is possible in this manner.

To furnish the most comprehensive possible calibration of the thickness gauge, the movement of the reference object within the entire measurement field could occur. Later thickness measurements on any measured objects are ensured with high accuracy within the entire measurement field on this account.

Determination of tilting of position of the line or surface in space and therefore the position of the reference object can occur in simple fashion from the recorded measured values. In an alternative embodiment, a reference sensor could be used to determine tilting or position and/or location of the reference object and/or measured object. Because of this, a particularly accurate determination of tilting or location and/or position could occur.

A line scanner or confocal scanner or camera could be used as at least one displacement sensor to record the measured values along a line or surface. For recording measured values along a line, laser line scanners could be used, for example, which project and evaluate a line on the measured object instead of a measurement point, as in laser triangulation sensors or in a measuring stylus. Tilting of the reference object and/or measured object can therefore be determined, because the sensor records a number of measurement points along the line, from which the position of the surface can be calculated. However, this can only occur with a line scanner in one direction. This is often sufficient, however, since strip material in the production process is transported in a preferred direction. Since the strip is guided over rolls, tilting can generally occur only in the feed direction, for example, by strip fluttering, strip sag or the like. In this case, tilting of the strip can be measured with one of the two line scanners or both. The line scanners could be arranged opposite each other, in which case the lines scan the upper and lower surface of the strip congruently. The lines are then aligned, so that the line runs in the direction of maximum tilting. By measuring the line with a sensor, the position of the strip relative to this sensor is already known, so that tilting can be calculated from the thickness measured value being measured.

This method can also be expanded to any tiltings by using sensors that measure superficially. Cameras work here, with which the position of the surface of the reference object and/or measured object in space is determined. A CCD camera, which has a matrix with numerous pixels, could be used as camera.

To furnish a particularly comprehensive calibration, the correction values for intermediate areas could be interpolated linearly from the determined correction values.

At least one displacement sensor could be arranged on two different sides of the reference object or measured object. The reference object or measured object is then situated almost between the sensors. As an alternative to this, at least two displacement sensors could be arranged next to each other on one side of the reference object or measured object, one sensor measuring the distance to the top and one sensing the distance to the bottom of the reference object. For example, with this arrangement, the layer thickness of insulation materials on a conducting material could be measured. Sensors of different working methods would be required for this purpose. For example, a capacitive displacement sensor could measure the distance to the surface of the insulation material. A displacement sensor operating according to the eddy current principle could measure through the insulation material on the surface of the electrically conducting material. The difference of these two determined distance values gives the thickness of the insulation material. As already mentioned above, a sensor that delivers two measured values independent of each other, for example, from the top and bottom of the reference and/or measured object, could also be sufficient for the above application.

In a particularly simple calibration, the reference object could have a constant thickness. Depending on the requirements, the reference object, however, could also have areas of different thickness, in which reference objects with complex shapes are conceivable. Ultimately, flaws of the displacement sensors within the measurement layout could be determined via the known geometry of the reference object.

Advantageously, the relative position of at least two sensors relative to each other and/or to the reference object or measured object could be determined with an appropriately structured reference object. A particularly versatile calibration and compensation of geometric errors is made possible on this account.

In the method according to the invention, in the simplest case, at least two measured values are required from the surface of the reference object, in order to determine tilting of the reference object in space. In a three-dimensional consideration, at least three measured values are required from the surface, in order to spatially determine tilting or position of the reference object, for calculation of thickness of the reference object, at least one additional measured value is required from the other side of the reference object or from an opposite surface.

To obtain the two or three measured values on a first surface of the reference object or measured object, in order to determine its tilting or position, either a single displacement sensor can be used, which is capable of determining two or three independent measured values at different locations. As an alternative, two or three individual displacement sensors could also be used for this purpose, each of which can determine the required number of measured values—two or three.

To calculate the thickness of the reference object or measured object, the recording of an additional measured value on an opposite surface or side of the reference object or measured object is still required. A difference formation can then be conducted to calculate the thickness value.

BRIEF DESCRIPTION OF THE SEVERAL VIEWS OF THE DRAWINGS

There are now different possibilities for configuring and modifying the instructions of the present invention advantageously. For this purpose, the various embodiments described herein are referred to, on the one hand, and the following explanation of preferred practical examples of the method according to the invention with reference to the drawing, on the other hand. In conjunction with explanation of preferred practical examples of the method according to the invention by means of the drawing, generally preferred embodiments and modifications of the instructions are also explained. In the drawing FIG. 1 shows a schematic view of a typical measurement layout for execution of a practical example of the method according to the invention for calibration of a thickness gauge, FIG. 2 schematically depicts the effect of tilting of a reference object on calculation of a thickness value, FIG. 3 schematically depicts the use of different sensors to record two measured values on a reference object or measured object, FIG. 4 schematically depicts the use of different sensors to record three measured values on a reference object or measured object, FIG. 5 schematically depicts the use of different sensors to record the additional measured value in the two-dimensional case, FIG. 6 schematically depicts the use of an individual sensor to determine measured values on both sides of a reference object.

DETAILED DESCRIPTION

Figure 1:
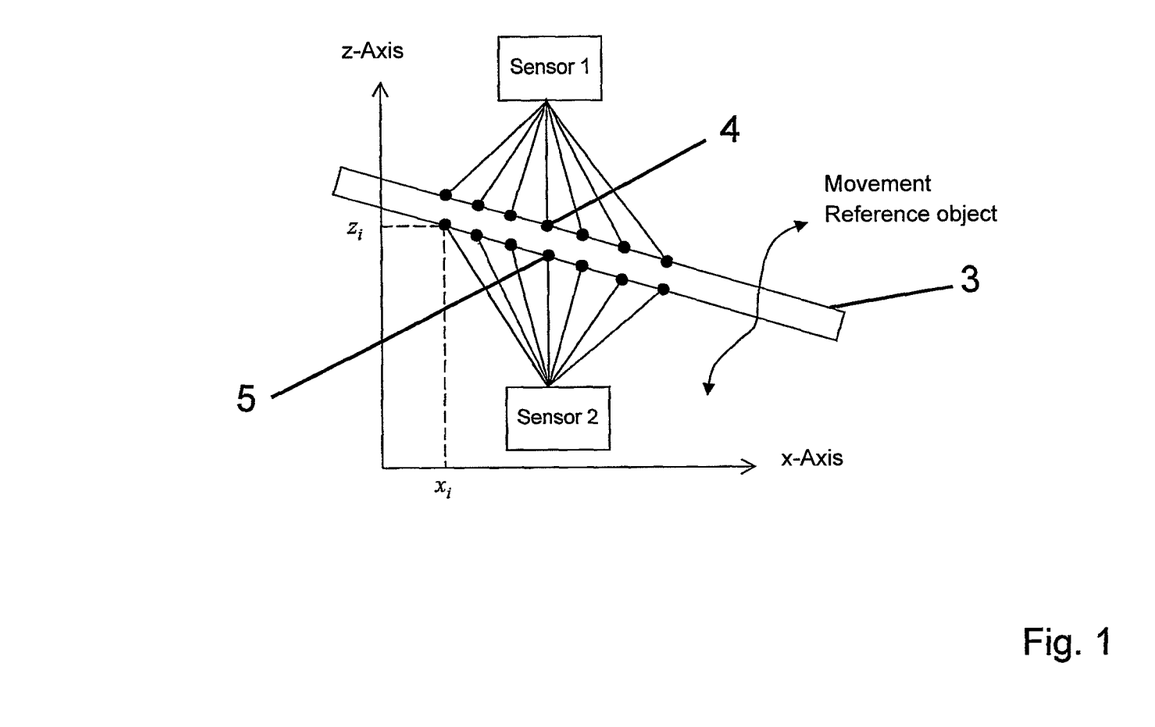

FIG. 1 schematically depicts a practical example of a measurement arrangement for performance of the method according to the invention for calibration of a thickness gauge. The design has two displacement sensors 1 and 2 that operate in contactless fashion to record several measured values along a line of a reference object 3, the reference object 3 with known thickness being brought into the measurement field of the displacement sensors 1 and 2. As an alternative to this, several individual sensors could also be arranged on each side of the reference object 3, each of which can record a measured value.

To determine the thickness of the reference object 3 in the measurement direction Z along the z-axis, the distance between the sensor 1 and a measurement point 4 and the distance between the sensor 2 and a measurement point 5 are subtracted from the total distance between sensors 1 and 2. In this difference formation, the calculated thickness of the reference object 3 and measurement direction Z then remains, which, however, does not correspond to the real thickness of the reference object 3 in the direction perpendicular to the surface.

In the method for calibration of a thickness gauge, the reference object 3 is initially moved within a partial area of the measurement field, the measured values being recorded by the two displacement sensors 1 and 2 in the form of value pairs $(x_i^1; z_i^1)$ and $(x_i^2; z_i^2)$ at stipulated times $t_j$ or as a function of the position $p_j$ of the reference object 3 along a line of the reference object 3. From the recorded measured values, the location of the line on reference object 3 in space could be established. In other words, the angle of tilting of reference object 3 relative to sensors 1 and 2 can be established.

Finally, calculation of a thickness profile occurs in the method by difference formation between the thickness calculated from the measured values of both displacement sensors 1 and 2 and each time $t_j$ or in each position $p_j$ and the known thickness of the reference object 3. It is then essential that during calculation, the measured values of the two sensors 1 and 2 are used, which were determined at the same time $t_j$ or in the same position $p_j$ of the reference object 3. Subscript j stands for an arbitrary number of times or positions.

Position- and location-dependent correction values in the partial area or measurement field are obtained from the calculated thickness values, in order to be able to compensate for geometric errors and/or non-linearities of the displacement sensors 1 and 2 in the partial area or measurement field during thickness measurement of an object being measured. As a result, particularly accurate measured values with respect to thickness of the object being measured are obtained.

In the practical example depicted here, measurement occurs along a line, so that only tiltings in the direction of the line can be considered. This restriction is not critical, for example, during measurement of the thickness of continuous sheet materials, since tiltings often only occur in the feed direction in these sheet materials.

However, the method can also be expanded to any tiltings by using superficially measuring sensors. For this purpose, CCD cameras could be used, with which the position of the surface of the reference object in space could be determined. Considering the position of the surface, the thickness of the measured object can then be exactly calculated by considering the correction value assigned to the position of the surface. The correction value in each case is a multi-dimensional function, determined by calibration.

During calibration, an exact parallel guiding of the reference object need no longer occur as in the prior art, but the reference object can be moved at any angle, which can also be varied, in the measurement field or partial area of the measurement field or between the sensors. A correction value is to be determined for each measurement point of a sensor.

In line scanners or cameras, because of the number of measured values (a line consists of numerous points and a camera can record a matrix with numerous pixels), the measurement accuracy can be further improved by statistical methods. There are different possibilities for thickness calculation, like determination of the average thickness or a thickness profile along the line, which need not necessarily be a straight line, or in the surface. It is also possible with these sensors to also measure complex objects with arched or differently shaped surfaces, instead of simple objects with constant thickness, since their topology can be recorded by linear or surface imaging and measured value recording.

Calculation of the thickness of the object being measured occurs as during calibration. Measured values are initially recorded by sensors 1 and 2, which lead to value pairs or value triples according to the employed sensor. These values must be recorded either at fixed times $t_j$ or as a function of the position $p_j$ of the measured object. It is simpler to use the time dependence, since this is essentially stipulated by the scanning frequency of sensors 1 and 2. The drawback here is that the support values during non-uniform movement of the object are not equidistant. A position-dependent performance of the method would be more accurate, but requires generally a reference sensor for particularly exact measurements. "Point clouds" on measured values that cover a plane or a spatial area at each time or at each position $p_j$ are obtained from this measurement. These measured values are initially beset with the linearity error of sensors 1 and 2.

In a next step, determination of tilting or location of the reference object 3 or line or surface in space occurs. The thickness profile can then be calculated, the calculated lines, surfaces or free-form surfaces being corrected with the correction values from the table or from the correction function. Before determining the position of the surface in space, calculation of an ideal line or surface could occur from the measured values at each time $t_j$ or at each position $p_j$. This could occur in objects with the same thickness by average value formation, interpolation or similar other known mathematical methods. In objects with arbitrary surface, a fit to the surface contour could occur. These ideal lines or surfaces obtained in this way could be considered in calculating the thickness profile and subsequent correction, in order to compensate, for example, for surface roughness of the object being measured during thickness determination.

It is a special advantage in the method according to the invention that the measurement accuracy can be significantly increased during thickness measurement. Movement of the reference object 3 between sensors 1 and 2 need no longer occur exactly parallel during calibration, but can be conducted relatively inaccurately, for example, even by hand, without demanding parallel movement units. During the measurement itself, the measurement error generated by tilting of the measured object is eliminated, since this tilting can be calculated from the measured values themselves. In addition, measured objects with almost any surface geometry can be measured with more than two or three sensors.

Figure 2:
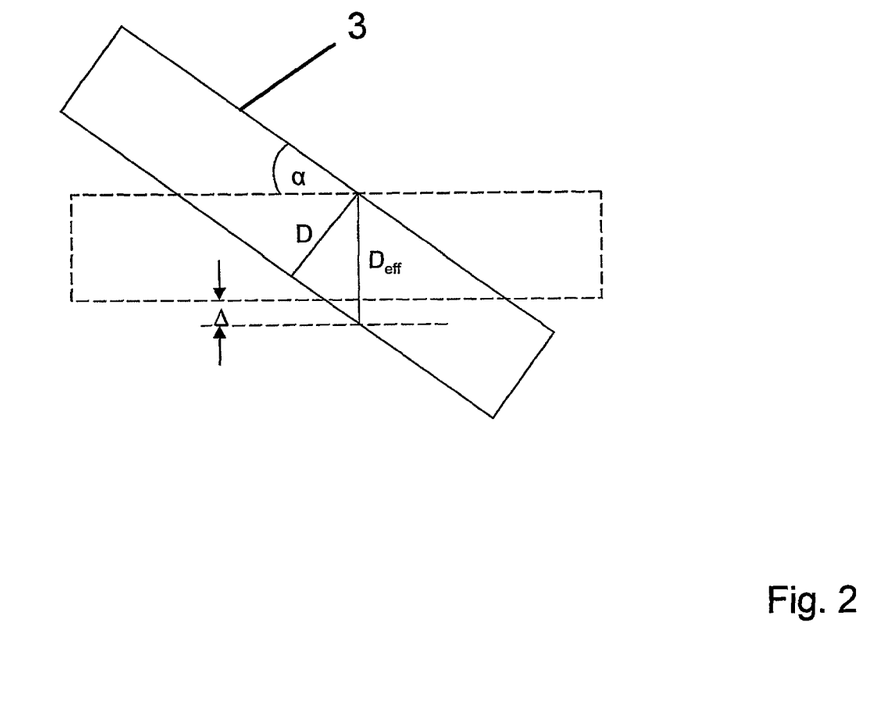

FIG. 2 shows, in a schematic view, the effect of tilting on a thickness measurement. By tilting of a reference object 3, an error is caused in the calibration process, which then has an effect on the subsequent thickness measured values. By tilting of a reference object 3 of known thickness D around an angle $\alpha$, a measurement error $\Delta$ only develops, owing to the fact that the effective thickness of the reference object $D_{eff}$ changes via the simple angle relation $D_{eff}=D/\cos\alpha$. $\Delta=D_{eff}-D=D(1/\cos\alpha-1)$ is then the measurement error. For example, tilting of only 5° already causes a measurement error of 0.38%. This is a significant error, which is much too high in many precision measurements. In an ordinary measurement, both the reference object and the actual measured object must therefore be exactly guided, which is often not possible in practice.

Figure 3:
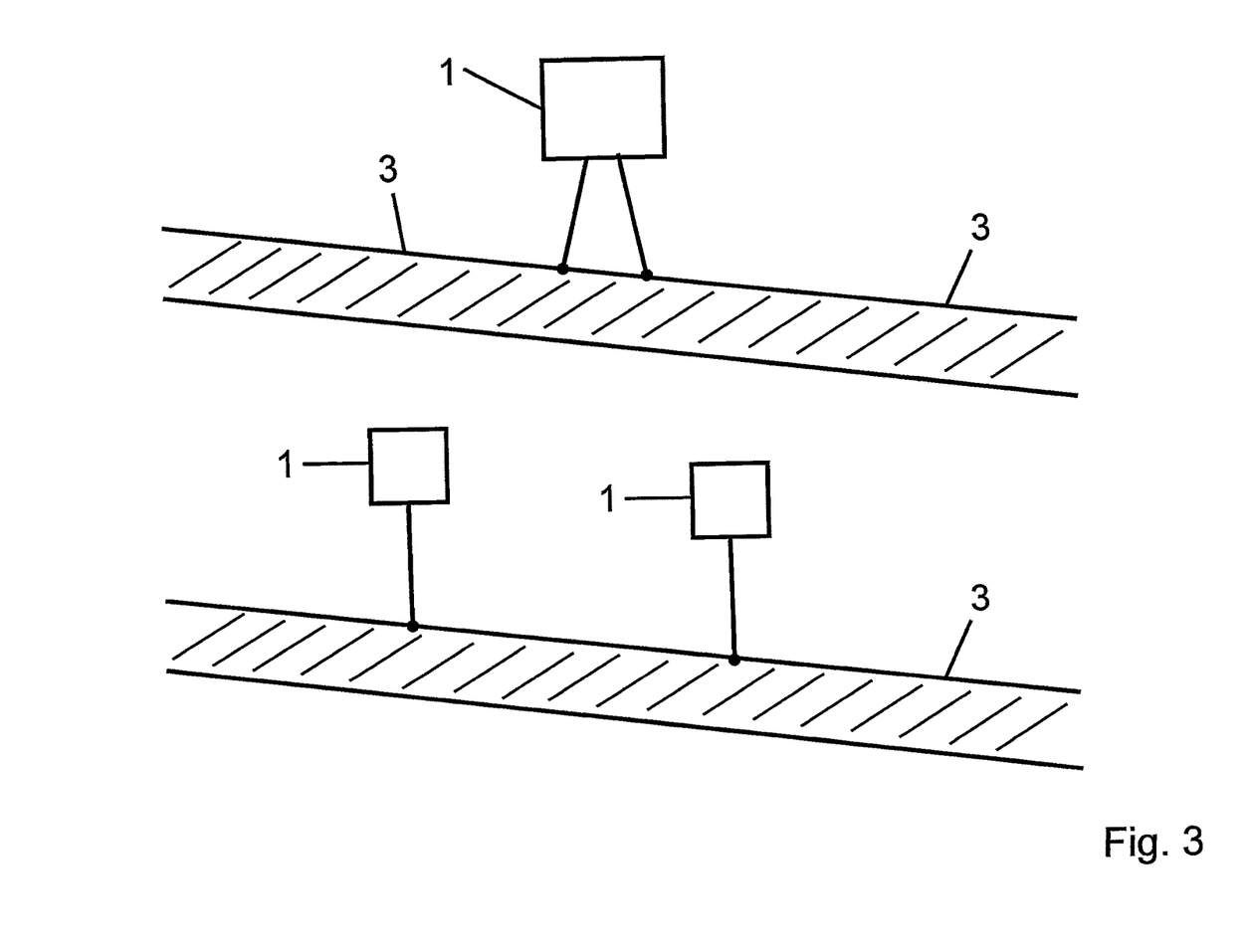

FIG. 3 schematically depicts the alternative use of the sensor 1, which is suitable for recording of two independent measured values on a reference object 3, in two individual sensors 1, each of which can record a measured value. Both arrangements are equally suited to determine the position of a line in space or a tilting.

FIG. 3 schematically depicts the alternative use of a sensor 1, which is suitable for recording three independent measured values on a reference object 3 and three individual sensors 1, each of which can record a measured value.

Figure 4:
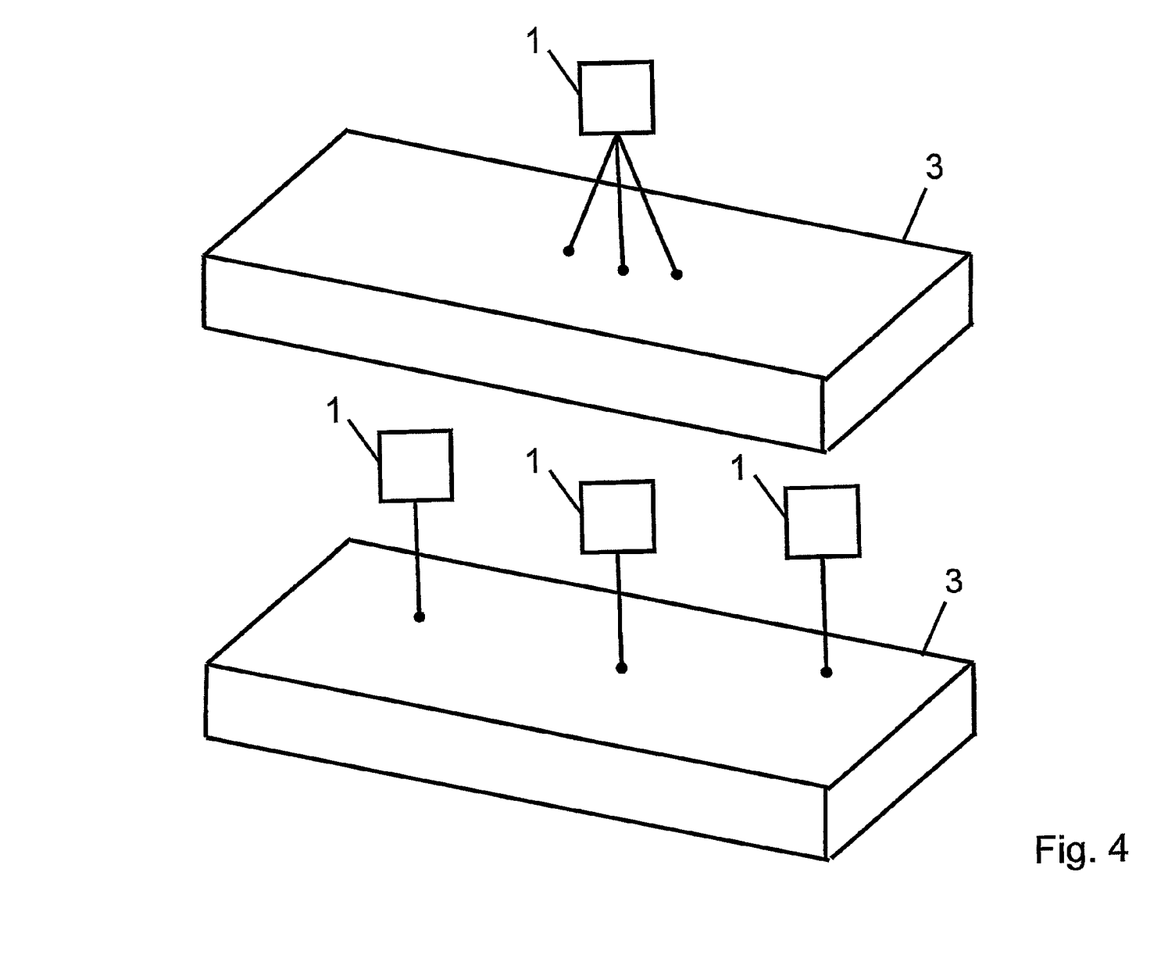

In the example depicted in FIG. 3, a line scanner could be used, which can record numerous independent measured values. In the practical example depicted in FIG. 4, a camera with numerous pixels can be used as individual sensor 1, in order to record numerous measured values.

Figure 5:
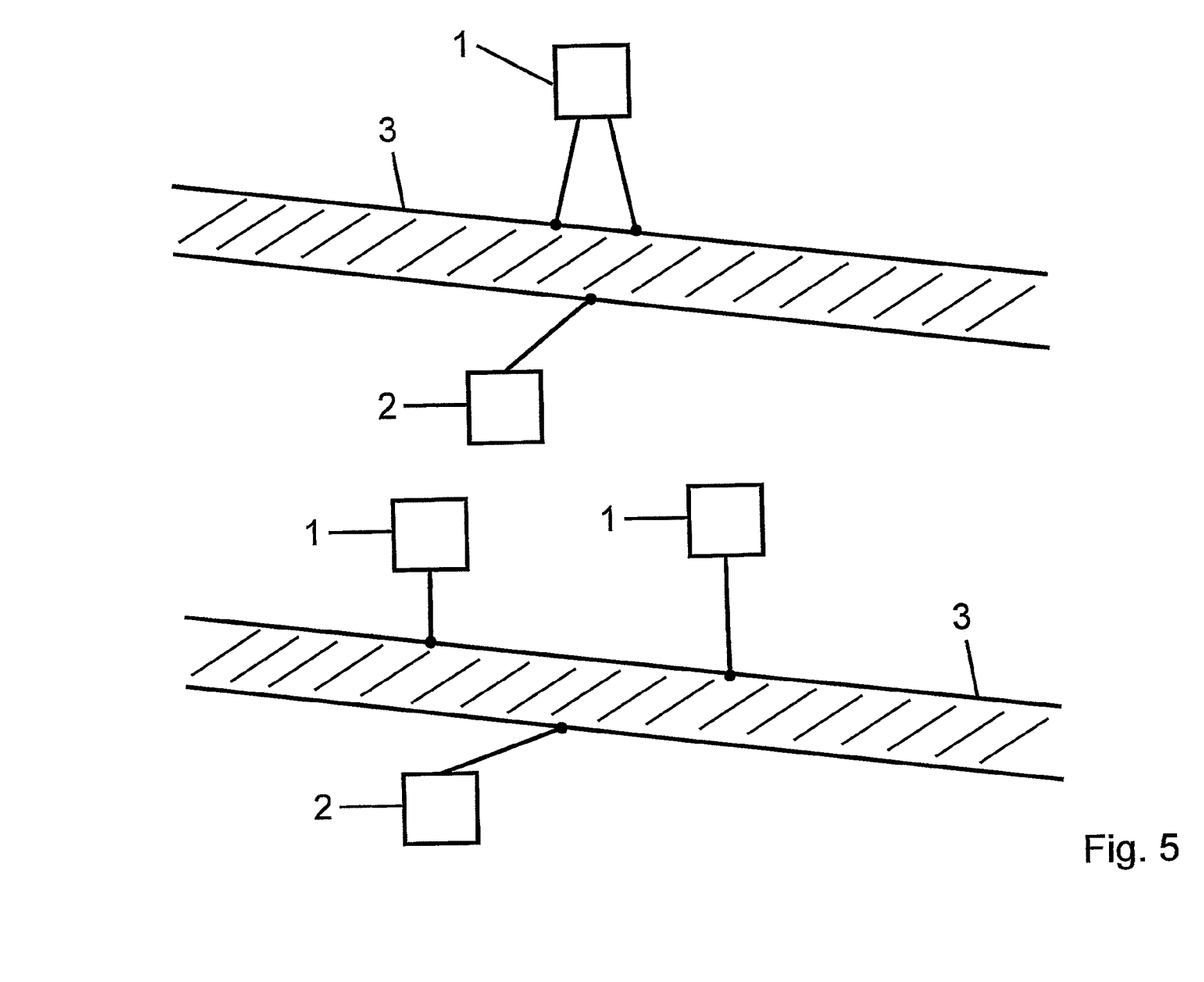

FIG. 5 schematically depicts the calculation of thickness in a case as shown in FIG. 3. Here recording of at least one measured value is required on the opposite surface of a reference object 3 by means of a sensor 2, for example.

Figure 6:
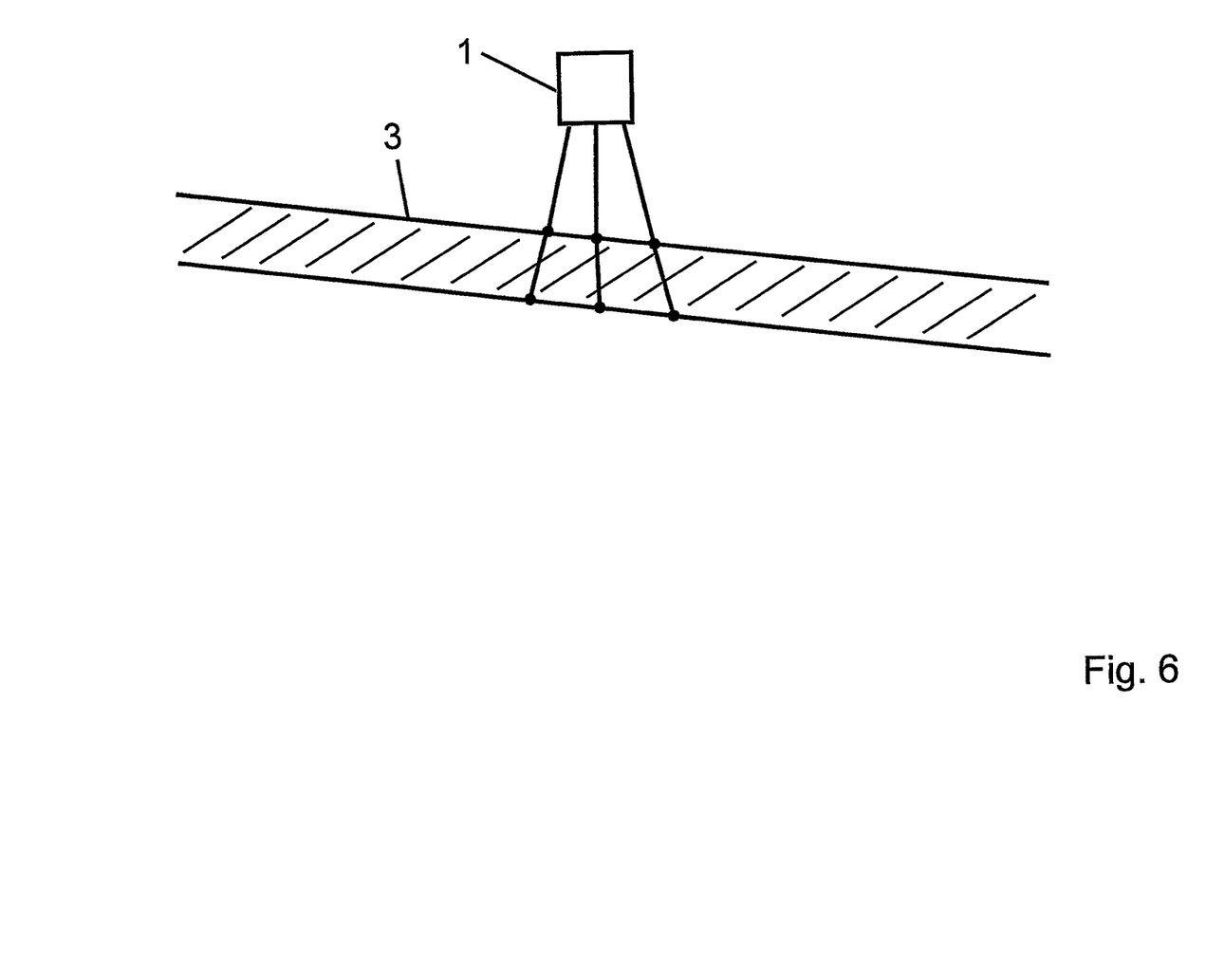

FIG. 6 schematically depicts the use of a sensor 1, which can record measured values from both the top and bottom of reference object 3. Such a sensor 1 could be a confocal scanner, which can be used in transparent reference objects 3 or measured objects. Depending on the requirements, two or more measured values can be recorded for the two-dimensional or three-dimensional case.

The preceding examples are shown for a reference object 3, which has a constant thickness along a scanned line or surface. If more than two or three measured values are recorded in this case, this increases the accuracy of the described method.

Figure 7A:
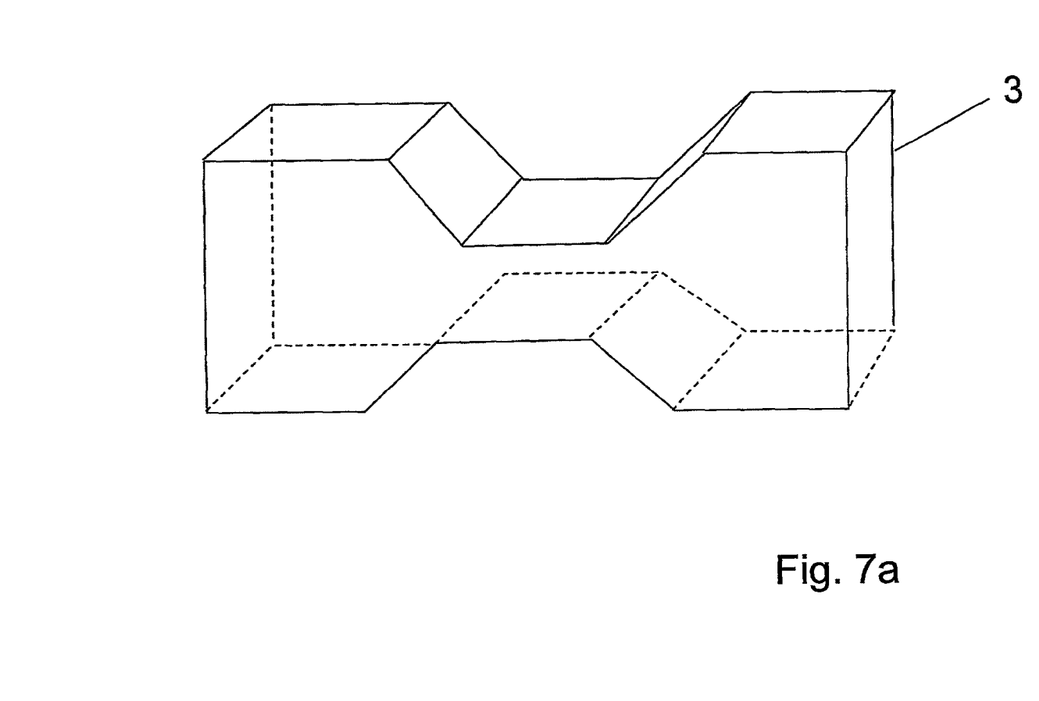
FIG. 7a shows an example of a reference object with a non-uniform surface structure and FIG. 7b shows scanning of the reference object from FIG. 7a with a laser scanner.

FIG. 7a schematically depicts a reference object 3 with a non-uniform surface contour, but which must be known during use in the described method. The surface contour data could be 3-D data, determined from a CAD method. This reference object 3 has a characteristic shape. For example, a "channel-like" profile is present here on a top and bottom of the reference object 3. By means of a reference object 3 formed this way, the position of sensors 1, 2 positioned on the top and bottom could also be determined and optionally corrected.

Quite generally, it can be stated that the reference object 3 can have any contour. A simple contour (as shown) reduces the calculation expense during calibration. However, any free-form surface could also be used. It must only be known. For example, it could be measured differently or known from CAD data.

Figure 7B:
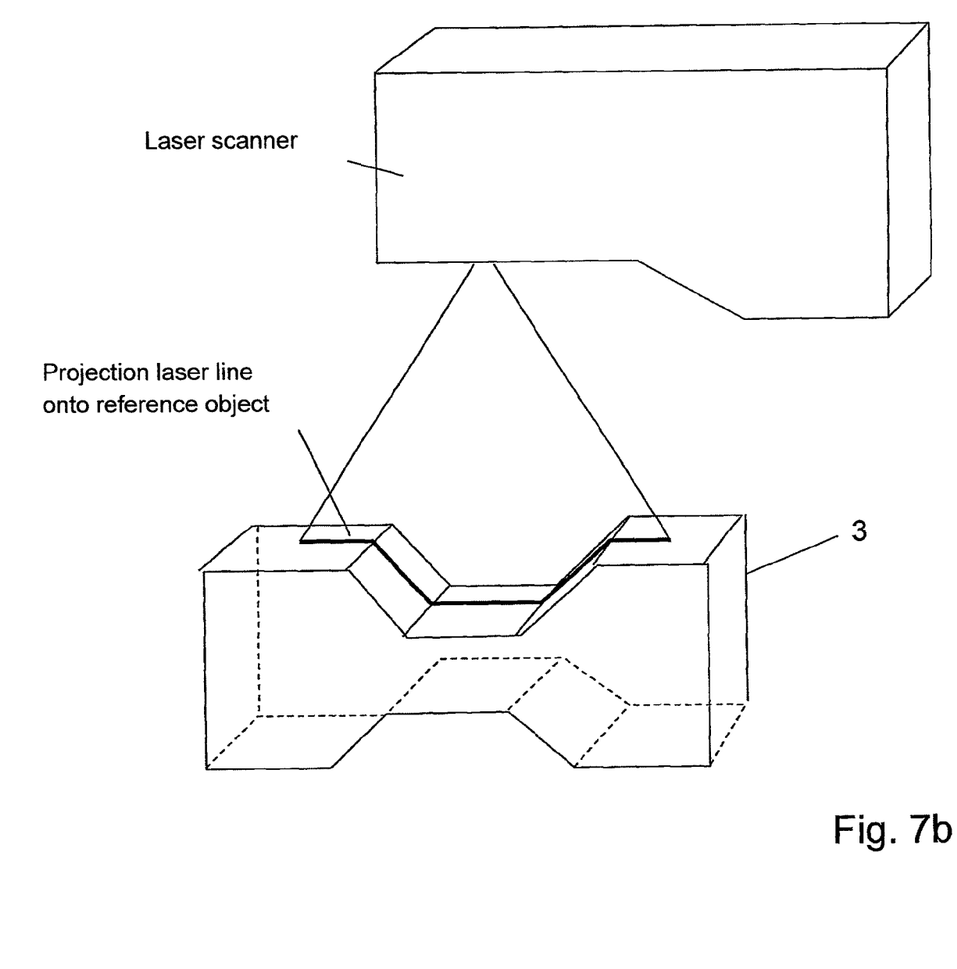

FIG. 7b shows scanning of the reference object 3 depicted in FIG. 7a with a laser scanner. The projection line of the laser scanner onto the reference object 3 is then shown. From the known geometry of the reference object 3 and the measured line, the characteristic of the laser scanner in space can be calibrated with the method according to the invention.

With respect to additional advantageous embodiments of the method according to the invention, to avoid repetitions, the general part of the description and the accompanying patent claims are referred to.

Finally, it is explicitly pointed out that the practical example described above of the method according to the invention only serves to explain the claimed instructions, but does not restrict them to the practical example.

The invention claimed is:

1. A method for calibration of a thickness gauge, in which the thickness gauge measures the thickness of a measured object in a stipulated measurement direction with at least one displacement sensor, operating contactless or by scanning, said method comprising:

bringing a reference object with known thickness and shape into at least a partial area of a measurement field of at least one displacement sensor;

recording at least two independent measured values by the at least one displacement sensor at at least two stipulated locations on a first surface of reference object at stipulated times $t_j$ or as a function of stipulated positions $p_j$ of reference object in the measurement field, in which j=1, 2, . . . ;

determining tilting or a spatial position of the reference object in the measurement field from the recorded measured values of times $t_j$ or as a function of positions $p_j$ of the reference object;

recording an additional measured value with the at least one displacement sensor on another location situated in the measurement direction on a second surface opposite the first surface or on a surface area of reference object opposite the first surface, in order to determine a thickness value of the reference object in measurement direction;

calculating the thickness value of the reference object from the measured values of at least one displacement sensor at times $t_j$ or in positions $p_j$ in measurement direction; and calculating the difference between the calculated thickness value and the known thickness of the reference object to obtain position- and tilting- or location-dependent correction values in the partial area or measurement field, in order to be able to compensate for geometric errors and/or non-linearities of at least one displacement sensor in the partial area or measurement field during a thickness measurement.

2. The method according to claim 1, wherein the reference object is moved within at least one partial area of the measurement field.

3. The method according to claim 1, wherein the measured values are recorded in the form of value pairs $((x_i^1; z_i^1), (x_i^2; z_i^2))$ during determination of tilting of the reference object in a stipulated plane or in the form of value triples $((x_i^1; y_i^1; z_i^1), (x_i^2; y_i^2; z_i^2))$ during determination of the three-dimensional spatial location of the reference object, in which the superscript denotes a sensor number and the subscript (i) a consecutive measured value number.

4. The method according to claim 1, wherein a thickness measurement occurs on a measured object according to the above measured value recording, tilting or position determination and thickness value calculation, in which correction of the thickness value with the correction values occurs.

5. The method according to claim 1, wherein compensation of geometric errors includes compensation of an angle error, which occurs especially in laser sensors during lateral impingement on the reference object and/or measured object.

6. The method according to claim 1, wherein recording of the measured values occurs along a line or surface or form of the reference object and/or measured object, in which determination of tilting or location of the reference object and/or measured object can include determination of tilting or location of the line or surface and/or can occur in absolute coordinates and/or relative to at least one of the displacement sensors and/or can include determination of a tilt angle, by which the reference object is sloped relative to a displacement sensor and/or can occur by means of the recorded measured values themselves.

7. The method according to claim 1, wherein correction values are stored in a memory and/or entered as a function.

8. The method according to claim 1, wherein before determination of tilting or location of the reference object and/or measured object, an ideal line $g^1(x_i^1; z_i^1)$ and/or $g^2(x_i^2; z_i^2)$ or ideal surface $f^1(x_i^1; y_i^1; z_i^1)$ and/or $f^2(x_i^2; y_i^2; z_i^2)$ is calculated from the measured values at each time $t_j$ or in each position $p_j$, in which calculation of the ideal lines and/or surfaces can occur by average value formation or interpolation, and/or in which the ideal lines and/or surface are the basis or can be used for calculation of thickness from the measured values.

9. The method according to claim 1, wherein a reference sensor is used to determine tilting or location and/or position of the reference object and/or measured object.

10. The method according to claim 1, wherein a line scanner or confocal scanner or camera is used as at least one displacement sensor.

11. The method according to claim 1, wherein the correction values for intermediate areas are linearly interpolated from the determined correction values.

12. The method according to claim 1, wherein at least one displacement sensor is arranged on two different sides of the reference object or measured object, or wherein at least two displacement sensors are arranged next to each other on one side of the reference object or measured object.

13. The method according to claim 1, wherein the reference object has a constant thickness, and/or in which the reference object can have a complex shape with preferably varying thickness.

14. The method according to claim 1, wherein flaws of the displacement sensors are determined via the known geometry of the reference object.

15. The method according to claim 1, wherein the relative location of at least two displacement sensors to each other or to the reference object or the measured object is determined with an appropriately structured reference object.

* * * * *

UNITED STATES PATENT AND TRADEMARK OFFICE
CERTIFICATE OF CORRECTION

PATENT NO. : 8,554,503 B2  
APPLICATION NO. : 12/992993  
DATED : October 8, 2013  
INVENTOR(S) : Schallmoser et al.

Page 1 of 1

It is certified that error appears in the above-identified patent and that said Letters Patent is hereby corrected as shown below:

Title page,
Item (73) Assignee: "Micro-Epsilon Messetechnik GmbH" should read
--Micro-Epsilon Messtechnik GmbH--.

Signed and Sealed this
Thirty-first Day of December, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO. : 8,554,503 B2  
APPLICATION NO. : 12/992993  
DATED : October 8, 2013  
INVENTOR(S) : Schallmoser et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 444 days.

Signed and Sealed this

Fifteenth Day of September, 2015

Michelle K. Lee
*Director of the United States Patent and Trademark Office*